US012701014B2

(12) United States Patent
Luo et al.

(10) Patent No.: US 12,701,014 B2
(45) Date of Patent: Aug. 4, 2026

(54) WRAPPER CIRCUIT FOR PROVIDING REPLAY AND INTEGRITY PROTECTION USING AN ENCRYPTION ALGORITHM

(71) Applicant: Cypress Semiconductor Corporation, San Jose, CA (US)

(72) Inventors: Hui Luo, Marlboro, NJ (US); Rakesh Taori, McKinney, TX (US); Florian Mendel, Munich (DE); Martin Schläeffer, Zell am See (AT)

(73) Assignee: Cypress Semiconductor Corporation, San Jose, CA (US)

( * ) Notice: Subject to any disclaimer, the term of this patent is extended or adjusted under 35 U.S.C. 154(b) by 174 days.

(21) Appl. No.: 18/797,470

(22) Filed: Aug. 7, 2024

(65) Prior Publication Data

US 2025/0286726 A1 Sep. 11, 2025

Related U.S. Application Data

(60) Provisional application No. 63/563,049, filed on Mar. 8, 2024.

(51) Int. Cl.
*H04L 29/06* (2006.01)
*H04L 9/06* (2006.01)
*H04L 9/32* (2006.01)

(52) U.S. Cl.
CPC .......... *H04L 9/3242* (2013.01); *H04L 9/0637* (2013.01)

(58) Field of Classification Search
CPC .... H04L 9/3242; H04L 9/0637; H04W 12/03; H04W 12/06; H04W 12/10; H04W 84/12
See application file for complete search history.

(56) References Cited

U.S. PATENT DOCUMENTS

| | | | | |
|---|---|---|---|---|
| 2008/0141023 A1* | 6/2008 | Qi | ...................... | H04L 63/0478 |
| | | | | 713/155 |
| 2020/0259635 A1* | 8/2020 | Junk | ................... | H04W 12/033 |
| 2023/0019180 A1* | 1/2023 | de Nijs | ................ | G06F 21/577 |
| 2023/0037746 A1* | 2/2023 | Buendgen | ........... | G06F 9/45545 |
| 2025/0286726 A1* | 9/2025 | Luo | ...................... | H04L 9/0637 |

\* cited by examiner

*Primary Examiner* — Mahfuzur Rahman

(57) ABSTRACT

Authenticated encryption algorithms may function in both a data encryption and authentication operational mode as well as an authentication only operational mode. A first circuit may generate encrypted data and generate a first authentication tag. The first circuit may output for transmission as part of an MPDU, the first authentication tag and either the encrypted data or plaintext data based a control flag. A receiver device may receive the MPDU and a second encryption circuit of the receiver device may receive the first authentication tag and, based on a control flag, receive either the plaintext data or the encrypted data and from the MPDU and generate a second authentication tag by encrypting the plaintext data or decrypting the encrypted data depending on which is received. The second circuit may verify that management frames of the MPDU are valid/have not been tampered with if the first and second authentication tags match.

17 Claims, 11 Drawing Sheets

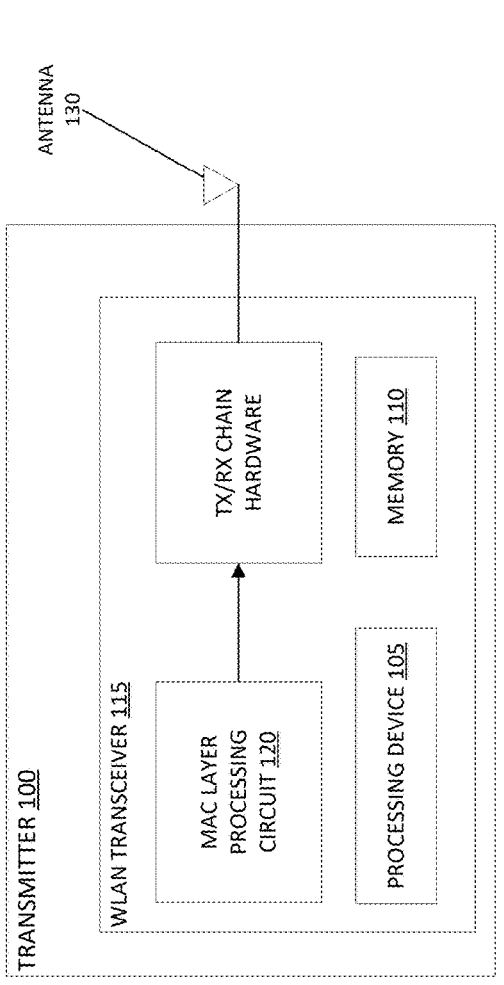
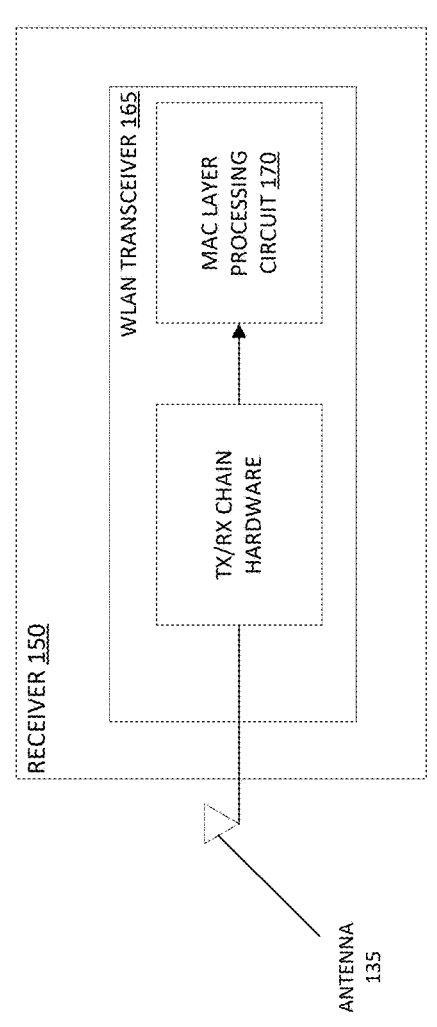
*FIG. 1*

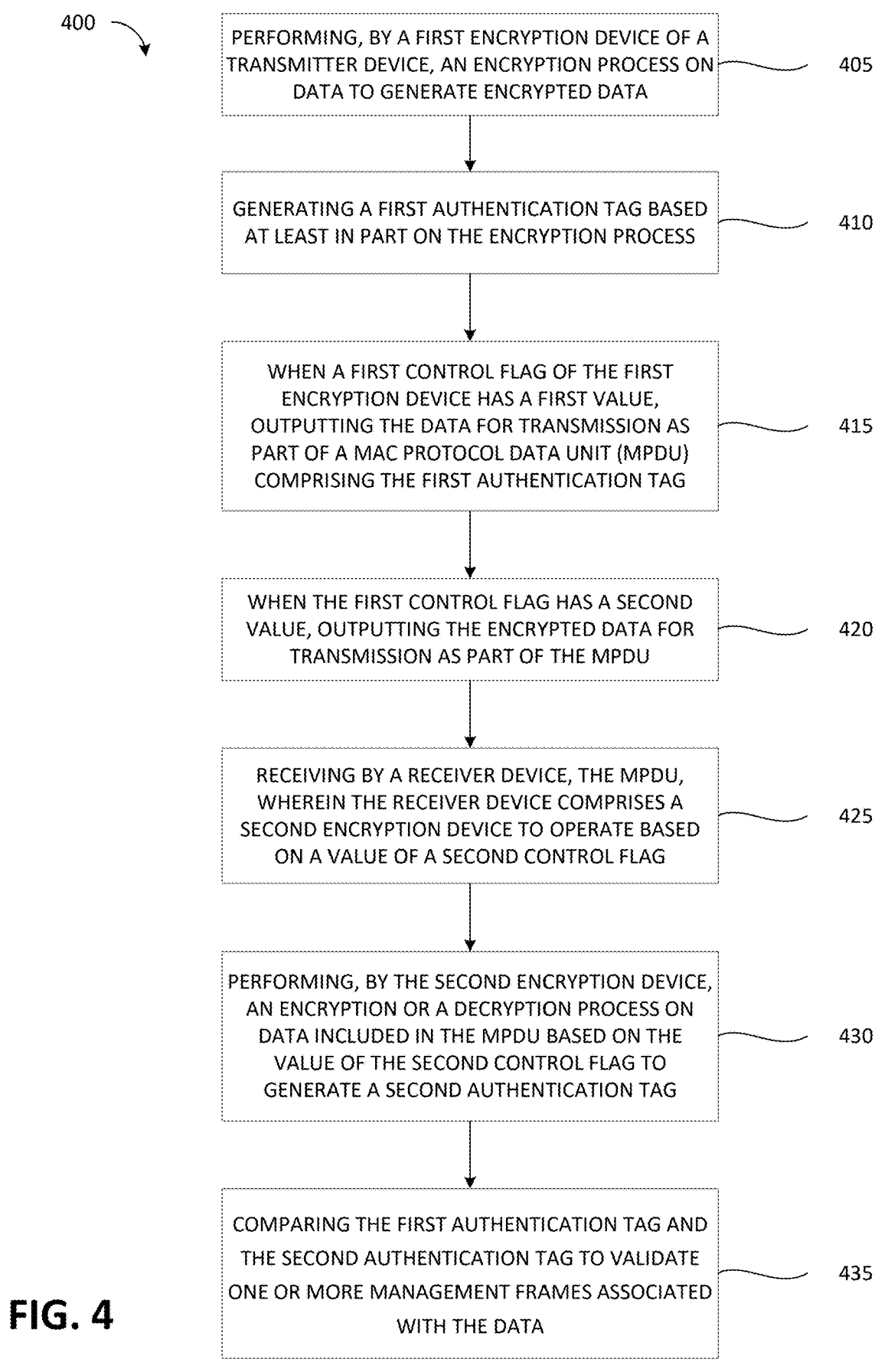

400

PERFORMING, BY A FIRST ENCRYPTION DEVICE OF A TRANSMITTER DEVICE, AN ENCRYPTION PROCESS ON DATA TO GENERATE ENCRYPTED DATA — 405

GENERATING A FIRST AUTHENTICATION TAG BASED AT LEAST IN PART ON THE ENCRYPTION PROCESS — 410

WHEN A FIRST CONTROL FLAG OF THE FIRST ENCRYPTION DEVICE HAS A FIRST VALUE, OUTPUTTING THE DATA FOR TRANSMISSION AS PART OF A MAC PROTOCOL DATA UNIT (MPDU) COMPRISING THE FIRST AUTHENTICATION TAG — 415

WHEN THE FIRST CONTROL FLAG HAS A SECOND VALUE, OUTPUTTING THE ENCRYPTED DATA FOR TRANSMISSION AS PART OF THE MPDU — 420

RECEIVING BY A RECEIVER DEVICE, THE MPDU, WHEREIN THE RECEIVER DEVICE COMPRISES A SECOND ENCRYPTION DEVICE TO OPERATE BASED ON A VALUE OF A SECOND CONTROL FLAG — 425

PERFORMING, BY THE SECOND ENCRYPTION DEVICE, AN ENCRYPTION OR A DECRYPTION PROCESS ON DATA INCLUDED IN THE MPDU BASED ON THE VALUE OF THE SECOND CONTROL FLAG TO GENERATE A SECOND AUTHENTICATION TAG — 430

COMPARING THE FIRST AUTHENTICATION TAG AND THE SECOND AUTHENTICATION TAG TO VALIDATE ONE OR MORE MANAGEMENT FRAMES ASSOCIATED WITH THE DATA — 435

FIG. 4

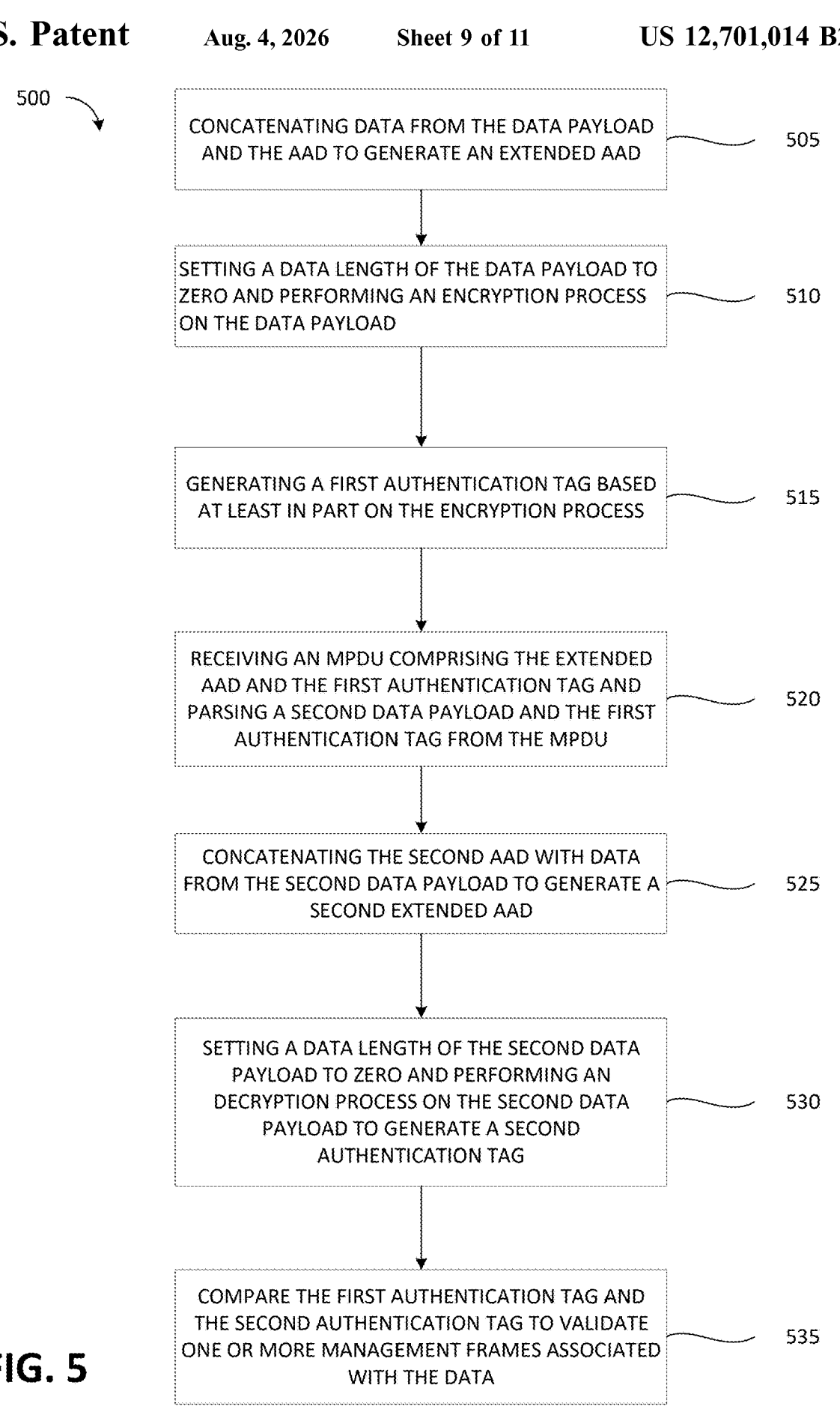

500

CONCATENATING DATA FROM THE DATA PAYLOAD AND THE AAD TO GENERATE AN EXTENDED AAD — 505

SETTING A DATA LENGTH OF THE DATA PAYLOAD TO ZERO AND PERFORMING AN ENCRYPTION PROCESS ON THE DATA PAYLOAD — 510

GENERATING A FIRST AUTHENTICATION TAG BASED AT LEAST IN PART ON THE ENCRYPTION PROCESS — 515

RECEIVING AN MPDU COMPRISING THE EXTENDED AAD AND THE FIRST AUTHENTICATION TAG AND PARSING A SECOND DATA PAYLOAD AND THE FIRST AUTHENTICATION TAG FROM THE MPDU — 520

CONCATENATING THE SECOND AAD WITH DATA FROM THE SECOND DATA PAYLOAD TO GENERATE A SECOND EXTENDED AAD — 525

SETTING A DATA LENGTH OF THE SECOND DATA PAYLOAD TO ZERO AND PERFORMING AN DECRYPTION PROCESS ON THE SECOND DATA PAYLOAD TO GENERATE A SECOND AUTHENTICATION TAG — 530

COMPARE THE FIRST AUTHENTICATION TAG AND THE SECOND AUTHENTICATION TAG TO VALIDATE ONE OR MORE MANAGEMENT FRAMES ASSOCIATED WITH THE DATA — 535

FIG. 5

WRAPPER CIRCUIT FOR PROVIDING REPLAY AND INTEGRITY PROTECTION USING AN ENCRYPTION ALGORITHM

CROSS REFERENCE TO RELATED APPLICATIONS

This Application claims the benefit of U.S. Provisional Application No. 63/563,049 filed Mar. 8, 2024, the contents of which are hereby incorporated by reference in their entirety.

TECHNICAL FIELD

The present disclosure relates generally to communication using the Wi-Fi™ protocol, and more particularly to implementing both data encryption and management frame authentication using a data encryption circuit.

BACKGROUND

Wireless communication devices may include transceivers configured to transmit/receive data using any of a variety of communication protocols. For example, a transceiver can transmit/receive signals using the Wi-Fi protocol, which specifies a variety of features including those related to encryption/security of data. The Wi-Fi protocol provides for authenticated data encryption using the 128-bit Advanced Encryption Standard (AES). The Wi-Fi protocol supports AES in a variety of modes such as "counter with cipher block chaining message authentication code" (CCM) mode and Galois counter mode (GCM).

Management frames such as authentication, de-authentication, association, dissociation, beacons, and probes are used by wireless clients to initiate and tear down sessions for network services. Unlike data traffic, which can be encrypted to provide a level of confidentiality, management frames must be heard and understood by all clients and therefore must be transmitted unencrypted. While these frames cannot be encrypted, they must be protected from forgery to prevent attacks on the wireless medium. For example, an attacker can spoof management frames from an access point to attack a client associated with the access point.

Thus, the Wi-Fi protocol also provides for robust management frame protection using the 128-bit Broadcast/Multicast Integrity Protocol (BIP) Galois Message Authentication Code (GMAC). BIP GMAC is a method for offering replay and integrity protection to group addressed management frames. Integrity protection and replay protection are important aspects in a robust network to prevent attacks that use management frames which are critical for stable network operation, but which can be easily spoofed and injected, such as beacon frames. BIP is used to calculate a message integrity code (MIC) based on the payload of the group addressed management frames (e.g., management media access control (MAC) protocol data unit (MMPDU)) and an additional authentication data (AAD) unit. The MIC is used to authenticate management frames transmitted from a transmitter device to a receiver device. In this way, AES and BIP GMAC together can provide data encryption and management frame protection.

With respect to data encryption and authentication, the Wi-Fi protocol currently requires communication devices to be able to operate in two modes. The first mode is a "data encryption and authentication" mode of operation where both data encryption and management frame protection functions are performed. The second mode is an "authentication only" mode of operation where only the management frame protection function is performed.

BRIEF DESCRIPTION OF THE DRAWINGS

The present embodiments are illustrated by way of example, and not of limitation, in the figures of the accompanying drawings.

FIG. 1 is a block diagram illustrating transmitter and receiver devices that may communicate using the Wi-Fi protocol, according to some embodiments of the present disclosure.

FIG. 4 is a flow diagram of a method for allowing an authenticated encryption algorithm to function in data encryption and authentication as well as authentication only modes of operation, according to some embodiments of the present disclosure.

FIG. 5 is a flow diagram of a method for allowing an authenticated encryption algorithm to function in data encryption and authentication as well as authentication only modes of operation, according to some embodiments of the present disclosure.

DETAILED DESCRIPTION

Figure 2A:
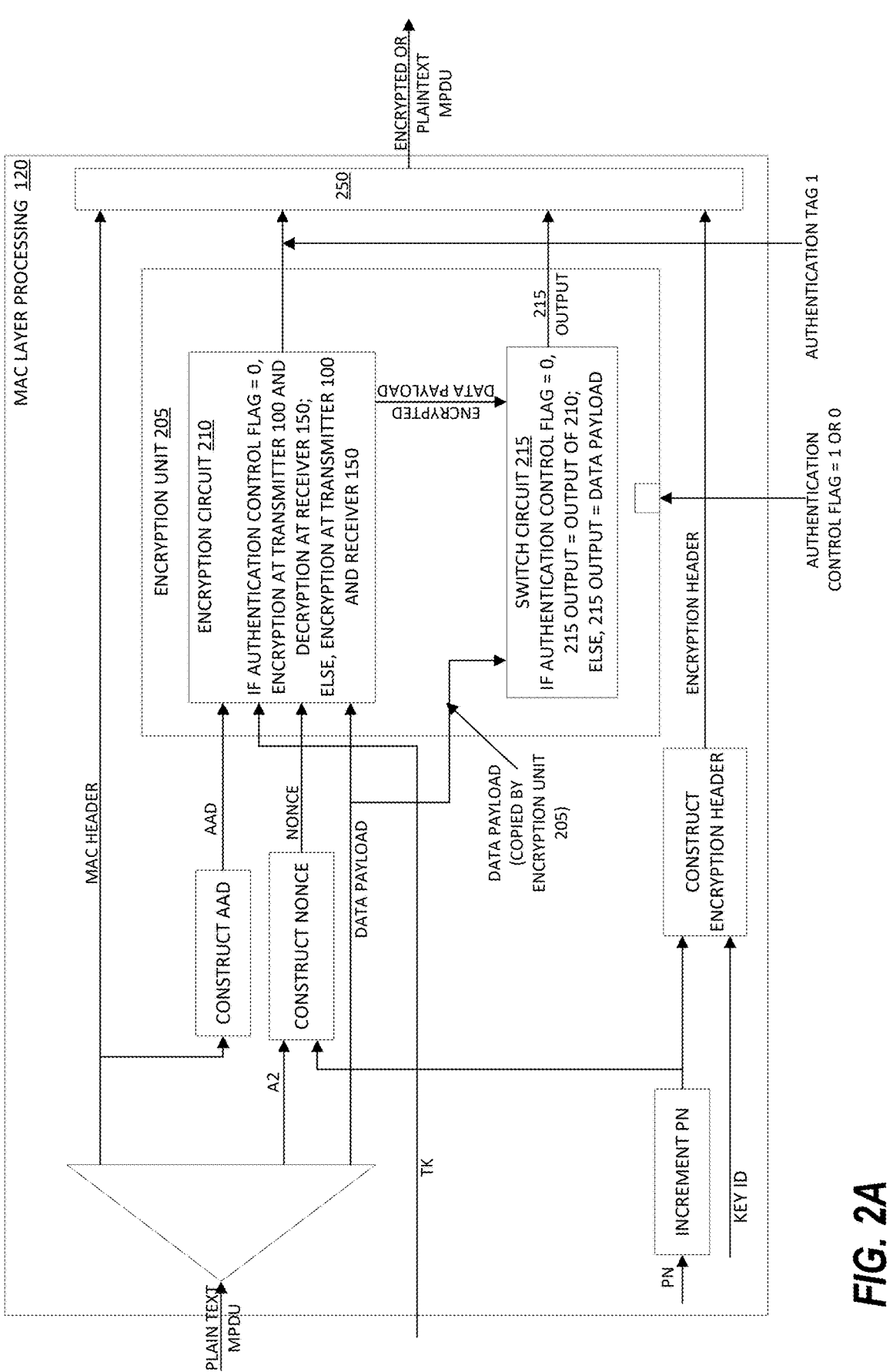
FIG. 2A is a block diagram illustrating an encryption unit of the transmitter of FIG. 1 implementing techniques for allowing an authenticated encryption algorithm to function in data encryption and authentication as well as authentication only modes of operation, according to some embodiments of the present disclosure.

In the following description, for purposes of explanation, numerous specific details are set forth in order to provide a thorough understanding of the present embodiments. It will be evident, however, to one skilled in the art that the present embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

Although AES can provide data encryption, there are algorithms that can provide authenticated encryption (i.e., both data encryption and authentication/management frame protection functionality). One example of such an algorithm is ASCON, which also provides a 128-bit symmetric cipher. Such algorithms can potentially replace the current 128-bit symmetric cipher provided by AES. However, because the Wi-Fi protocol requires provision of a data encryption and authentication mode as well as an authentication only mode, replacing AES requires additional functionality to allow an authenticated encryption algorithm to output original data with an MIC (as would be the case in an authentication only mode) as well as encrypted data with a MIC (as would be the case in a data encryption and authentication mode).

The embodiments described herein are directed to circuits that implement an authenticated encryption algorithm and may function in a data encryption and authentication mode of operation as well as an authentication only mode of operation. The circuits may function based on an authentication control flag having one of two values. If the authentication control flag has a first value (e.g., "1"), it may operate in an "authentication only" mode. More specifically, a first circuit that is part of a transmitter device may copy plaintext data block by block, encrypt the plaintext data to generate encrypted data and generate a first authentication tag based on the encrypting. The first circuit may output the copied plaintext data and the first authentication tag for transmission as part of a MAC protocol data unit (MPDU). A receiver device may receive the MPDU, and a second circuit that is part of the receiver device may receive the copied plaintext data and the first authentication tag from the MPDU. The second circuit may encrypt the copied plaintext data and generate a second authentication tag based on the encrypting. The second circuit may verify that management frames associated with the MPDU are valid/have not been tampered with if the first authentication tag and the second authentication tag match.

If the authentication control flag has a second value (e.g., "0"), it may operate in a "data encryption and authentication" mode. More specifically, the first circuit may copy plaintext data block by block, encrypt the plaintext data and generate a first authentication tag based on the encrypting. The first circuit may output the encrypted data and the first authentication tag for transmission as part of a MAC protocol data unit (MPDU). The receiver device may receive the MPDU, and the second circuit may receive the encrypted data and the first authentication tag from the MPDU. The second circuit may decrypt the encrypted data and generate a second authentication tag based on the decrypting. The second circuit may verify that management frames associated with the MPDU are valid/have not been tampered with if the first authentication tag and the second authentication tag match.

In other embodiments, the first circuit may concatenate the underlying data of the plaintext data with an AAD to generate an extended AAD, and set a data length of the plaintext data to zero. The first circuit may encrypt the plaintext data (data length zero) and generate a first authentication tag based on the encryption. The first circuit may output the extended AAD and the first authentication tag for transmission as part of a MAC protocol data unit (MPDU). The receive device may receive the MPDU, and the second circuit may receive the plaintext data (via the extended AAD) and the first authentication tag from the MPDU. The second circuit may concatenate the underlying data of the plaintext data with an AAD to generate a second extended AAD, and set a data length of the plaintext data to zero. The second circuit may decrypt the plaintext data and generate a second authentication tag based on the decrypting. The second circuit may verify that management frames associated with the MPDU are valid/have not been tampered with if the first authentication tag and the second authentication tag match.

Embodiments of the present disclosure may be implemented in any appropriate version of the Wi-Fi protocol. For example, embodiments of the present disclosure may be implemented in Wi-Fi 802.11bn, where the ability to reuse the same hardware/circuitry for a data encryption and authentication mode of operation as well as an authentication only mode of operation may benefit Wi-Fi 802.11bn's emphasis on low power/power efficient operation.

FIG. 1 is a block diagram illustrating a transmitter device 100 (also referred to herein as transmitter 100), which may be an access point (or any other appropriate device) in a Wi-Fi network. In the example of FIG. 1, the transmitter 100 may include a WLAN transceiver 115 which may include transmit and receive chains (not shown), each of which may be comprised of signal processing components such as a low noise amplifier, a mixer, a variable gain amplifier, a low pass filter, a digital-to-analog converter (DAC), an analog-to-digital converter (ADC), a demodulator, and a detector. The transmit and receive chains may be selectively coupled to an antenna 130 using e.g., a T/R switch (not shown).

As shown in FIG. 1, the transmitter 100 further includes a media access control (MAC) layer processing circuit 120 (also referred to herein as MAC circuit 120). The MAC layer controls access to the physical medium, such as a network cable or wireless channel. The MAC circuit 120 may provide MAC layer encryption which can help prevent unauthorized access to the network by encrypting the data transmitted over the physical medium. The MAC circuit 120 may use symmetric key encryption, where the same key is used for encryption and decryption, or asymmetric key encryption, where different keys are used for encryption and decryption.

FIG. 1 also illustrates a receiver device 150 (also referred to herein as receiver 150), which may be a station (or any other appropriate device) in the Wi-Fi network. In the example of FIG. 1, the receiver 150 may include an antenna 135 via which it may receive signals transmitted by the transmitter 100, for example. The receiver 150 may also include a WLAN transceiver 165 which may have similar components/structure as the WLAN transceiver 115. Each of the WLAN transceiver 115 and the WLAN transceiver 165 may include hardware such as processing device 105 and memory 110 (which may include storage devices such hard-disk drives (HDD), solid-state drives (SSD) random access memory (RAM), other non-volatile memories, etc.). The processing device 105 may perform any appropriate signal processing functions including in some embodiments, certain functions of the MAC circuit 120. In other embodiments, the MAC circuit 120 may include its own dedicated processing device. It should be noted that although referred to as transmitter 100 and receiver 150, this is for ease of description only and both the transmitter 100 and receiver 150 may function/be capable of functioning as both a transmitter and receiver.

FIG. 2A illustrates the MAC circuit 120 in accordance with some embodiments of the present disclosure. As shown in FIG. 2A, the MAC circuit 120 may include an encryption unit 205 comprising an encryption circuit 210 and a switch circuit 215. The encryption circuit 210 may be a circuit that implements any appropriate authenticated encryption algorithm, such as the ASCON algorithm. The MAC circuit 120 may receive a plaintext MAC protocol data unit (MPDU) to be transmitted by the transmitter 100 and may parse from the plaintext MPDU, a MAC header, a MAC address (shown as A2 in the FIGS.) and a data payload of the MPDU. The MAC circuit 120 may generate an additional authentication data (AAD) unit based on information in the MAC header including the MPDU frame control (FC) field and a number of MPDU address fields as is known in the art. The MAC circuit 120 may also generate a nonce based on the MAC address and the current value of the package number (shown as PN in the FIGS.). The package number may be a value that is incremented each time a nonce needs to be generated so that each generated nonce is unique, thereby providing replay protection. The MAC circuit 120 may also receive an encryption key (shown as TK in the FIGS.) which may be used when encrypting data as discussed in further detail herein. The MAC circuit 120 may also use the current value of the package number and a key ID of the encryption key to generate an encryption header indicating the key ID.

The encryption circuit 210 may receive the AAD, the nonce, the data payload, and the encryption key and may encrypt the data payload using the encryption key and the nonce to generate an encrypted data payload. The encryption circuit 210 may also generate an authentication tag (referred to herein and in FIGS. 2A-2C as authentication tag 1) comprising a message integrity code (MIC) which the encryption circuit 210 may calculate based on the AAD and the encryption of the data payload. More specifically, as the encryption circuit 210 performs encryption operations on the data payload, its internal state (i.e., the internal state of the encryption and hashing algorithm implemented by the encryption circuit 210) will change as the data encryption progresses block by block through the data payload. The internal state of the encryption circuit 210 during encryption of the final block of the data payload is used by the encryption circuit 210 along with the AAD to generate the authentication tag 1. More specifically, the internal state of the encryption circuit 210 may comprise a bit string whose initial value is based on the nonce and the encryption key. The encryption circuit 210 encrypts the data payload block by block, and may use the initial value of the internal state to encrypt the first block. Whenever a block of the data payload is encrypted, the internal state that will be used in the next block is updated using permutation operations on the previous internal state and the previously encrypted data block. When the last block of the data payload is encrypted, the encryption circuit 210 may generate the authentication tag 1 based on the internal state of the encryption circuit 210 during the encryption of the final block of the data payload and the AAD.

The encryption circuit 210 may output the authentication tag 1 to MPDU construction logic 250 and may output the encrypted data payload to the switch circuit 215. The switch circuit 215 may also receive the data payload as shown in FIG. 2A. More specifically, the MAC circuit 120 may copy the data payload block by block and provide the copied data payload to the switch circuit 215.

The encryption unit 205 may also include an authentication control flag which may be set to a first value (e.g., 1) or a second value (e.g., 0). When the authentication control flag is set to a value of 1, the encryption unit 205 may function in an authentication only mode where it may use the authentication tag 1 generated by the encryption circuit 210 to provide replay and integrity protection to management frames (but does not provide/transmit encrypted data) as discussed in further detail herein. In authentication only mode, the encryption circuit 210 may generate the encrypted data payload and the authentication tag 1 as described hereinabove, and may output the authentication tag 1 to the MPDU construction logic 250 and output the encrypted data payload to the switch circuit 215. Because the encryption unit 205 is in authentication only mode, the switch circuit 215 may output the copied data payload (not the encrypted data payload) since the encrypted data is not needed.

The MPDU construction logic 250 may generate a plain text MPDU using the MAC header, the authentication tag 1, the copied data payload and the Galois/Counter Mode Protocol (GCMP) header. The MAC circuit 120 may output the plain text MPDU to the transmitter 100, which may transmit the plain text MPDU to the receiver 150.

When the authentication control flag is set to a value of 0, the encryption unit 205 may function in a data encryption and authentication mode where it may encrypt the data payload as well as use the authentication tag 1 generated by the encryption circuit 210 to provide replay and integrity protection to management frames. More specifically, the encryption circuit 210 may generate the encrypted data payload and the authentication tag 1 as described hereinabove, and may output the authentication tag 1 to the MPDU construction logic 250 and output the encrypted data payload to the switch circuit 215. Because the encryption unit 205 is in "data encryption and authentication" mode, the switch circuit 215 may output the encrypted data payload (not the copied data payload) to the MPDU construction logic 250 since the encrypted data is to be transmitted.

The MPDU construction logic 250 may generate an encrypted MPDU using the MAC header, the authentication tag 1, the encrypted data payload, and the GCMP header and the MAC circuit 120 may output the encrypted MPDU to the transmitter 100, which may transmit the encrypted MPDU to the receiver 150.

Figure 2B:
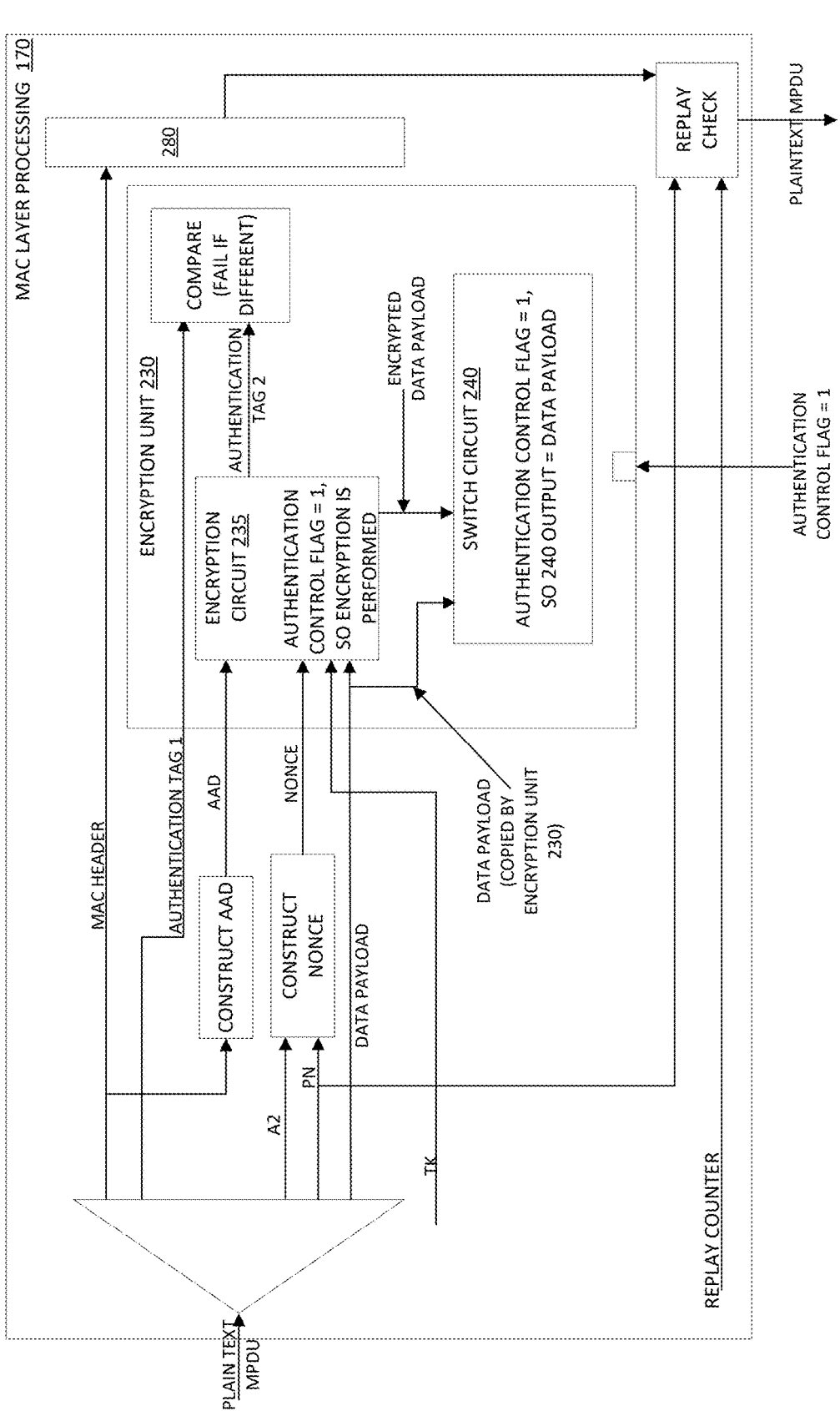
FIGS. 2B and 2C are block diagrams illustrating an encryption unit of the receiver of FIG. 1 implementing techniques for allowing an authenticated encryption algorithm to function in data encryption and authentication as well as authentication only modes of operation, according to some embodiments of the present disclosure.

FIG. 2B illustrates the MAC circuit 170 of the receiver 150. Similar to the MAC circuit 120, the MAC circuit 170 may include an encryption/decryption unit 230 comprising an encryption/decryption circuit 235 and a switch circuit 240. The encryption/decryption circuit 235 may be similar to the encryption circuit 210 illustrated in FIG. 2A and may be a circuit that implements any appropriate authenticated encryption algorithm, such as the ASCON algorithm. The encryption/decryption unit 230 may also include an authentication control flag which may be set to a first value (e.g., 1) or a second value (e.g., 0).

In some embodiments, the encryption/decryption unit 230 may set the value of its authentication control flag based on the data received from the transmitter 100. If the encryption/decryption unit 230 receives a plain text MPDU, it may determine that the encryption circuit 210 is operating in authentication only mode and set the value of its authentication control flag to 1 accordingly. If the encryption/decryption unit 230 receives an encrypted MPDU, it may determine that the encryption circuit 210 is operating in data encryption and authentication mode and set the value of its authentication control flag to 0 accordingly.

Thus, when the authentication control flag of the encryption unit 205 is set to a value of 1, the authentication control flag of the encryption/decryption unit 230 may also be set to a value of 1. Similarly, when the authentication control flag of the encryption unit 205 is set to a value of 0, the authentication control flag of the encryption/decryption unit 230 may also be set to a value of 0. When the authentication control flag is set to a value of 1, the encryption/decryption unit 230 may function in an authentication only mode where it may use an authentication tag generated by the encryption/decryption circuit 235 (hereinafter referred to as authentication tag 2) and the received authentication tag 1 to provide replay and integrity protection to management frames as discussed in further detail herein. When the authentication control flag is set to a value of 0, the encryption unit 205 may function in a "data encryption and authentication" mode where it may decrypt the encrypted data payload parsed from the encrypted MPDU as well as use the authentication tag 2 generated by the encryption/decryption circuit 235 and the received authentication tag 1 to provide replay and integrity protection to management frames.

FIG. 2B illustrates the encryption/decryption unit 230 when the authentication control flag of the encryption/decryption unit 230 (and thus the authentication control flag of the encryption unit 205) is set to a value of 1 (i.e., the encryption unit 205 and the encryption/decryption unit 230 are both operating in "authentication" mode). The MAC circuit 170 may receive the plain text MPDU transmitted by the transmitter 100 and may parse from the plain text MPDU the MAC header, the MAC address (shown as A2 in the FIGS.) and the data payload of the plain text MPDU. The MAC circuit 170 may generate an additional authentication data (AAD) unit (which is similar to the AAD generated by the MAC circuit 120) based on information in the MAC header including the MPDU frame control (FC) field and a number of MPDU address fields as is known in the art. The MAC circuit 170 may also generate a nonce based on the MAC address and the current value of the package number (shown as PN in the FIGS.) as discussed with respect to FIG. 2A. The MAC circuit 170 may further parse from the plain text MPDU the authentication tag 1 (comprising the MIC) generated by the encryption circuit 210 and the encryption key (from the encryption header).

The encryption/decryption circuit 235 may receive the AAD, the nonce, the data payload, and the encryption key, and because the authentication control flag is set to a value of 1, the encryption/decryption circuit 235 may encrypt the data payload using the encryption key and the nonce to generate an encrypted data payload. The encryption/decryption circuit 235 may also generate the authentication tag 2 comprising a message integrity code (MIC) which the encryption/decryption circuit 235 may calculate based on the AAD and the encryption of the data payload as discussed with respect to authentication tag 1 generated by the encryption circuit 210. The encryption/decryption circuit 235 may output the authentication tag 2 to the encryption/decryption unit 230 and output the encrypted data payload to the switch circuit 240. The switch circuit 240 may also receive the data payload as shown in FIG. 2B. More specifically, the encryption/decryption unit 230 may copy the data payload block by block and provide the copied data payload to the switch circuit 240. Because the encryption/decryption unit 230 is the "authentication" mode, the switch circuit 215 may output the copied data payload (not the encrypted data payload) since the encrypted data is not needed.

The encryption/decryption unit 230 may compare the authentication tag 2 to the received authentication tag 1 to determine if they match. If the authentication tag 2 and the authentication tag 1 match, the encryption/decryption unit 230 may confirm that the management frames of the plain text MPDU received from the transmitter 100 have not been tampered with. If the authentication tag 2 and the authentication tag 1 do not match, the encryption/decryption unit 230 may determine that the management frames of the plain text MPDU received from the transmitter 100 have been tampered with and fail/discard the data payload.

Figure 2C:
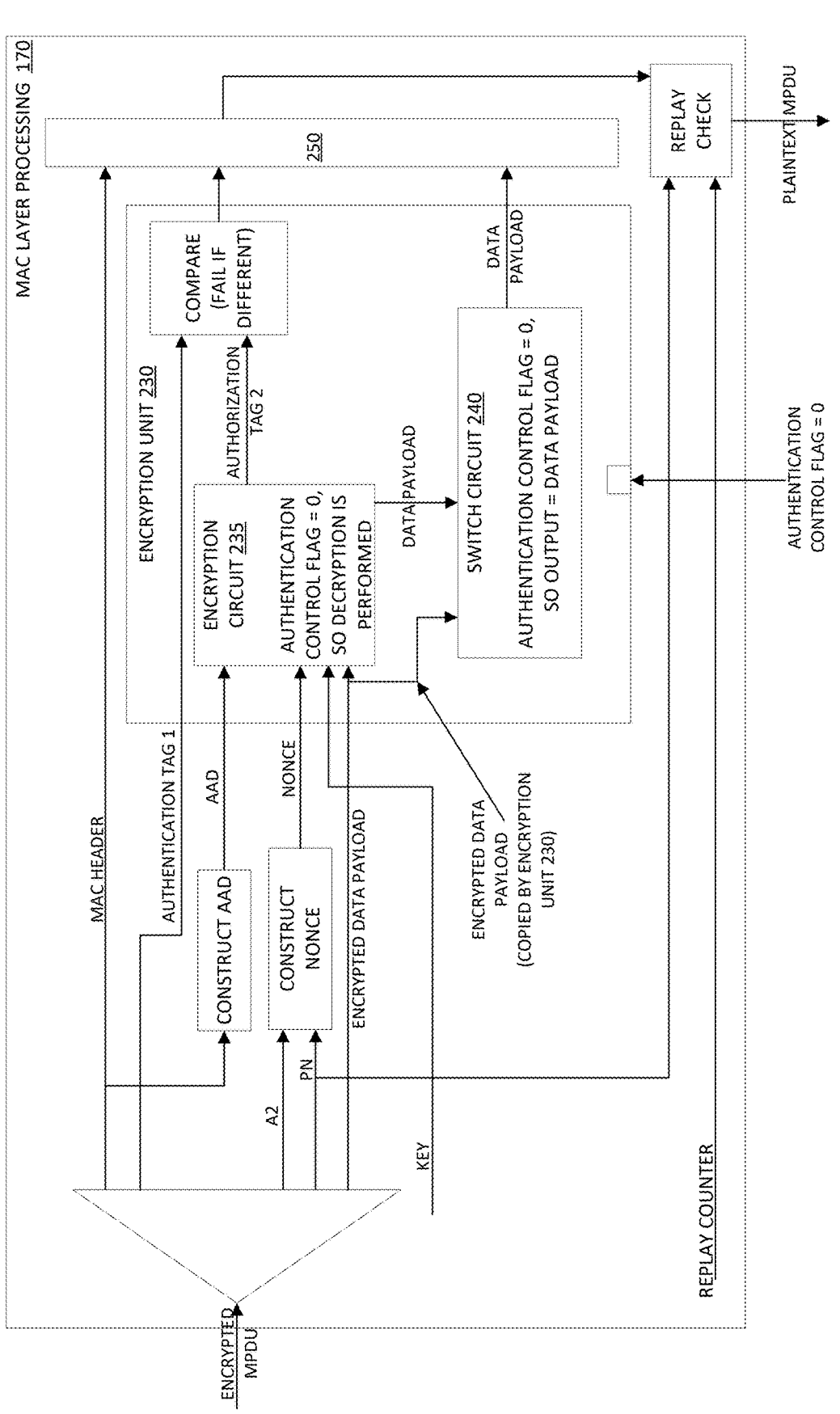

FIG. 2C illustrates the encryption/decryption unit 230 when the authentication control flag of the encryption/decryption unit 230 (and thus the authentication control flag of the encryption unit 205) is set to a value of 0 (i.e., the encryption unit 205 and the encryption/decryption unit 230 are both operating in "data encryption and authentication" mode). In "data encryption and authentication" mode, although the encryption circuit 210 may operate in an encryption mode, the encryption/decryption circuit 235 may operate in a decryption mode. The MAC circuit 170 may receive the encrypted MPDU transmitted by the transmitter 100 and may parse from the encrypted MPDU the MAC header, the MAC address (shown as A2 in the FIGS.) and the encrypted data payload of the encrypted MPDU. The MAC circuit 170 may generate an additional authentication data (AAD) unit (which is similar to the AAD generated by the MAC circuit 120) based on information in the MAC header including the MPDU Frame Control (FC) field and a number of MPDU address fields as is known in the art. The MAC circuit 170 may also generate a nonce based on the MAC address and the current value of the package number (shown as PN in the FIGS.) as discussed with respect to FIG. 2A. The MAC circuit 170 may also receive the encryption key (shown as TK in the FIGS.) used by the encryption circuit 210 which was transmitted by the transmitter 100. The MAC circuit 170 may further parse from the encrypted MPDU the authentication tag 1 (comprising the MIC) generated by the encryption circuit 210 and the encryption key (from the encryption header). The MAC circuit 170 may also use the current value of the package number and a key ID of the encryption key to generate an encryption header indicating the key ID.

The encryption/decryption circuit 235 may receive the AAD, the nonce, the encrypted data payload, and the encryption key and may decrypt the encrypted data payload using the encryption key and the nonce to generate the data payload. The encryption/decryption circuit 235 may also generate an authentication tag comprising a message integrity code (MIC) which the encryption/decryption circuit 235 may calculate based on the AAD and the decryption of the encrypted data payload. More specifically, as the encryption/decryption circuit 235 performs decryption operations on the data payload, its internal state (i.e., the internal state of the encryption and hashing algorithm implemented by the encryption/decryption circuit 235) will change as the data decryption progresses block by block through the encrypted data payload. The internal state of the encryption/decryption circuit 235 during decryption of the final block of the encrypted data payload is used by the encryption/decryption circuit 235 along with the AAD to generate the authentication tag 2. The encryption/decryption circuit 235 may output the authentication tag 2 and may output the (decrypted) data payload to the switch circuit 215. The switch circuit 240 may also receive the encrypted data payload as shown in FIG. 2C. More specifically, the encryption/decryption unit 230 may copy the encrypted data payload block by block and provide the copied encrypted data payload to the switch circuit 240.

The encryption/decryption circuit 235 may output the authentication tag 2 to the encryption/decryption unit 230 and output the data payload to the switch circuit 240. Because the encryption/decryption unit 230 is in the "data encryption and authentication" mode, the switch circuit 240 may output the data payload (not the copied encrypted data payload).

The encryption/decryption unit 230 may compare the authentication tag 2 to the received authentication tag 1 to determine if they match. If the authentication tag 2 and the authentication tag 1 match, the encryption/decryption unit 230 may confirm that the management frames of the encrypted MPDU received from the transmitter 100 have not been tampered with and provide the data payload to the MPDU construction logic 280 which may generate a plain text MPDU using the MAC header, the data payload and the GCMP header. The MAC circuit 170 may output the plain text MPDU for further processing by the receiver 150 (e.g., once the MAC circuit 170 has verified the plain text MPDU via replay check). If the authentication tag 2 and the authentication tag 1 do not match, the encryption/decryption unit 230 may determine that the management frames of the encrypted MPDU received from the transmitter 100 have been tampered with and fail/discard the data payload.

Figure 3A:
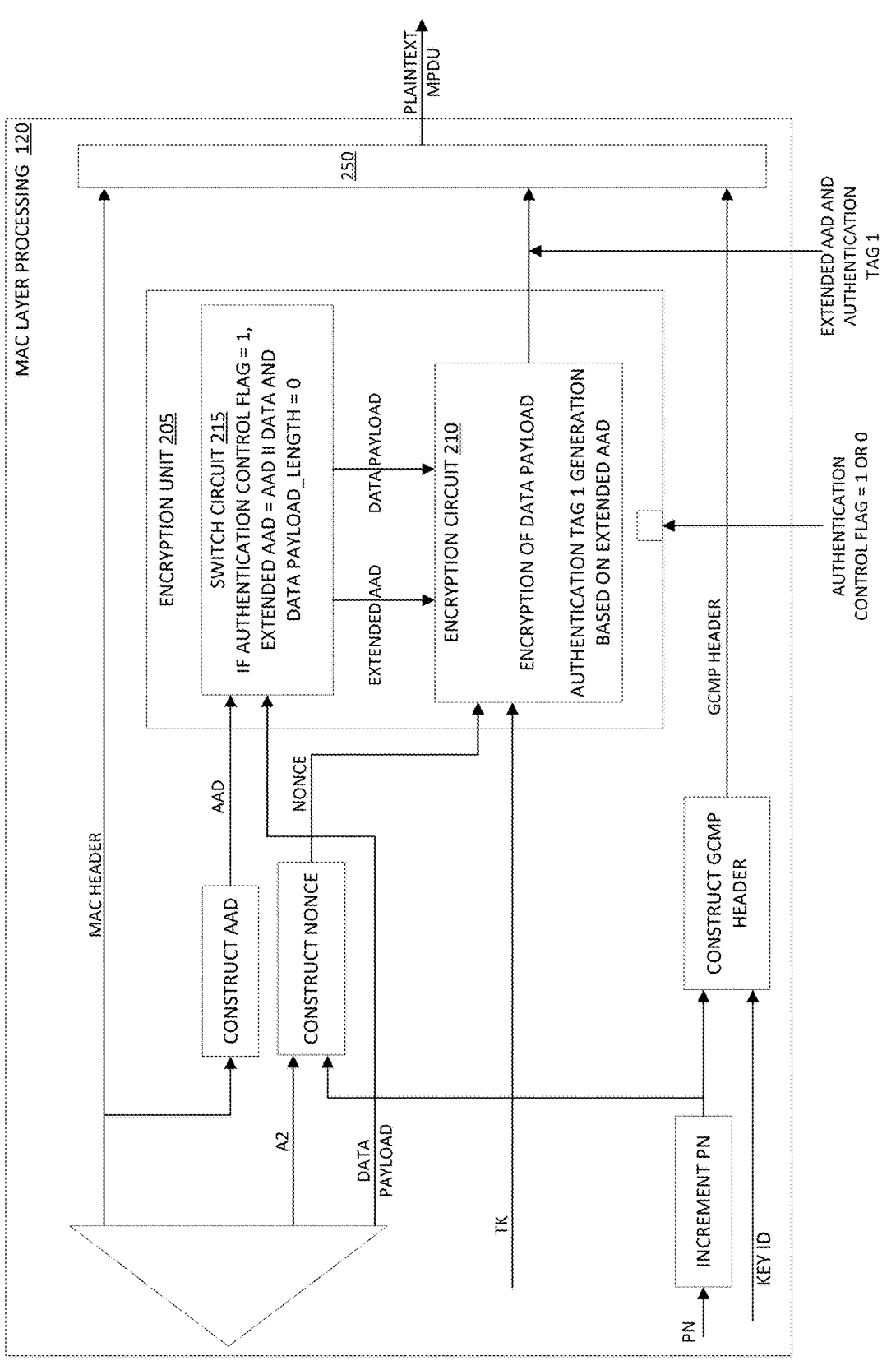
FIG. 3A is a block diagram illustrating an encryption unit of the transmitter of FIG. 1 implementing techniques for allowing an authenticated encryption algorithm to function in data encryption and authentication as well as authentication only modes of operation, according to some embodiments of the present disclosure.

In some embodiments, instead of the encryption circuit 210 directly operating on the data payload from the plain text MPDU, the encryption unit 205 may concatenate the AAD with data payload to generate an extended AAD. The encryption circuit 210 may operate on the extended AAD as discussed in further detail herein. FIG. 3A illustrates the MAC circuit 120 in an example embodiment where the encryption unit 205 may utilize an extended AAD.

When the authentication control flag of the MAC circuit 120 is 0 (i.e., the encryption unit 205 and the encryption/decryption unit 230 are both operating in "data encryption and authentication" mode), the switch circuit 215 may receive the AAD and the data payload and pass the AAD and the data payload to the encryption circuit 210 which may generate an encrypted data payload and the authentication tag 1. The encryption circuit 210 may output the authentication tag 1 and the encrypted data payload to the MPDU construction logic 250. The MPDU construction logic 250 may generate an encrypted MPDU using the MAC header, the authentication tag 1, the encrypted data payload, and the GCMP header and the MAC circuit 120 may output the encrypted MPDU to the transmitter 100, which may transmit the encrypted MPDU to the receiver 150.

When the authentication control flag of the MAC circuit 120 is 1 (i.e., the encryption unit 205 and the encryption/decryption unit 230 are both operating in "authentication" mode), the switch circuit 215 may receive the AAD and the data payload, and may concatenate the AAD with the data from the data payload to generate an extended AAD that includes the data from the data payload. The switch circuit 215 may also set the length of the data payload to zero (since its data is now part of the extended AAD), and output both the extended AAD and the data payload (which now has a data length of zero) to the encryption circuit 210. Because the data payload length is zero, the encryption circuit 210 will not perform encryption and instead will only generate the authentication tag 1 for the extended AAD. The encryption circuit 210 may output the authentication tag 1 along with the extended AAD to the MPDU construction logic 250. The MPDU construction logic 250 may generate a plaintext MPDU using the MAC header, the extended AAD, the authentication tag 1, and the GCMP header. The MAC circuit 120 may output the plaintext MPDU to the transmitter 100, which may transmit the plaintext MPDU and the encryption key to the receiver 150.

Figure 3B:
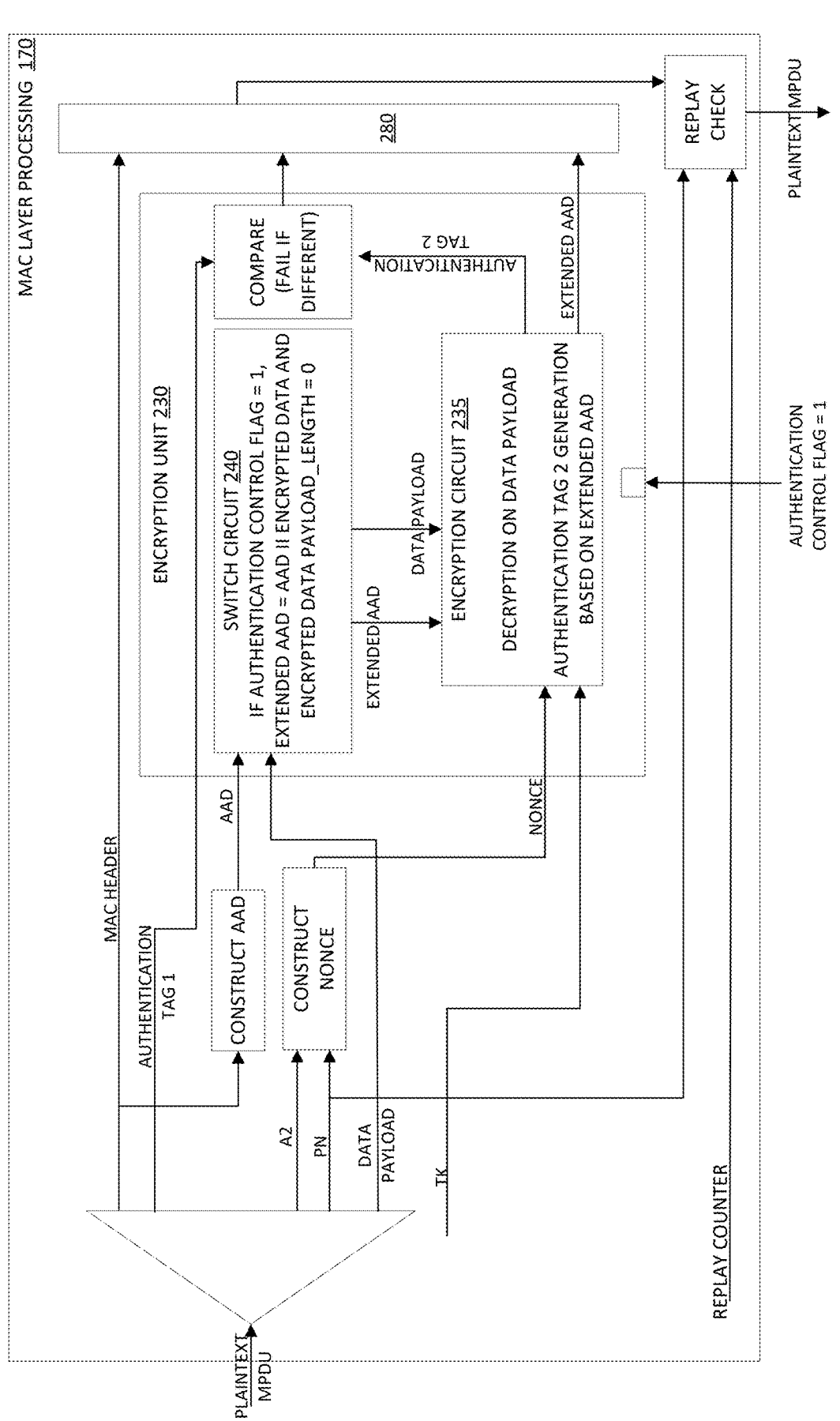
FIG. 3B is a block diagram illustrating an encryption unit of the receiver of FIG. 1 implementing techniques for allowing an authenticated encryption algorithm to function in data encryption and authentication as well as authentication only modes of operation, according to some embodiments of the present disclosure.

FIG. 3B illustrates the MAC circuit 170 when the authentication control flag of the encryption/decryption unit 230 (and thus the authentication control flag of the encryption unit 205) is set to a value of 1 (i.e., the encryption unit 205 and the encryption/decryption unit 230 are both operating in "authentication" mode). In response to receiving the plaintext MPDU from the transmitter 100, the MAC circuit 170 may parse from the plaintext MPDU, the MAC header, the MAC address (shown as A2 in the FIGS.), the data payload (from the extended AAD), and the authentication tag 1. The MAC circuit 170 may generate an AAD and a nonce based on the MAC address and the current value of the package number (shown as PN in the FIGS.).

The switch circuit 240 may receive the AAD and the data payload and may concatenate the AAD with the data from the data payload to generate an extended AAD that includes the data from the data payload. The switch circuit 240 may set the length of the data payload to zero (since its data is now part of the extended AAD), and output both the extended AAD and the data payload (which now has a data length of zero).

The encryption/decryption circuit 235 may receive the extended AAD, the data payload (data length of zero), the encryption key, and the nonce. Because the length of the data payload has been set to zero, the encryption/decryption circuit 235 may not perform decryption on the data payload and instead may only generate an authentication tag 2.

The encryption/decryption unit 230 may compare the authentication tag 2 to the received authentication tag 1 to determine if they match. If the authentication tag 2 and the authentication tag 1 match, the encryption/decryption unit 230 may confirm that the management frames of the plaintext MPDU received from the transmitter 100 have not been tampered with. If the authentication tag 2 and the authentication tag 1 do not match, the encryption/decryption unit 230 may determine that the management frames of the encrypted MPDU received from the transmitter 100 have been tampered with and fail/discard the encrypted data payload.

Figure 3C:
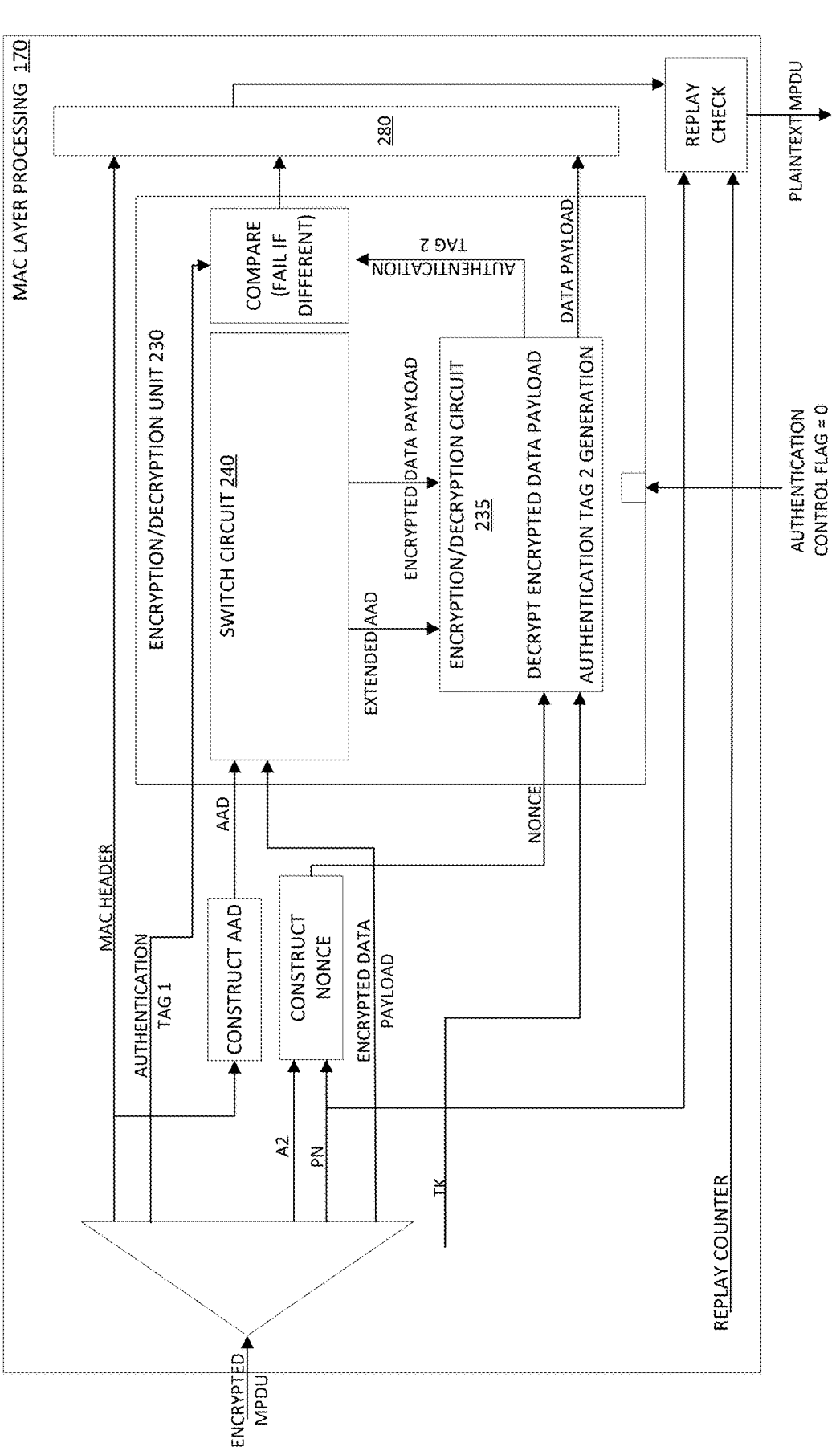
FIG. 3C is a block diagram illustrating an encryption unit of the receiver of FIG. 1 implementing techniques for allowing an authenticated encryption algorithm to function in data encryption and authentication as well as authentication only modes of operation, according to some embodiments of the present disclosure.

FIG. 3C illustrates the MAC circuit 170 when the authentication control flag of the encryption/decryption unit 230 (and thus the authentication control flag of the encryption unit 205) is set to a value of 0 (i.e., the encryption unit 205 and the encryption/decryption unit 230 are both operating in "data encryption and authentication" mode). In response to receiving the encrypted MPDU from the transmitter 100, the MAC circuit 170 may parse from the encrypted MPDU, the MAC header, the MAC address (shown as A2 in the FIGS.), the encrypted data payload (from the extended AAD), and the authentication tag 1. The MAC circuit 170 may generate an AAD and a nonce based on the MAC address and the current value of the package number (shown as PN in the FIGS.).

The switch circuit 240 may receive the AAD and the encrypted data payload and may pass the AAD and the encrypted data payload to the encryption/decryption circuit 235 which may decrypt the encrypted data payload and generate an authentication tag 2 as discussed hereinabove. The encryption/decryption unit 230 may compare the authentication tag 2 to the received authentication tag 1 to determine if they match. If the authentication tag 2 and the authentication tag 1 match, the encryption/decryption unit 230 may confirm that the management frames of the encrypted MPDU received from the transmitter 100 have not been tampered with. If the authentication tag 2 and the authentication tag 1 do not match, the encryption/decryption unit 230 may determine that the management frames of the encrypted MPDU received from the transmitter 100 have been tampered with and fail/discard the encrypted data payload.

Embodiments of the present disclosure enable a circuit implementing an authenticated encryption algorithm to function in both a data encryption and authentication mode of operation as well as an authentication only mode of operation, thereby complying with Wi-Fi protocol requirements.

FIG. 4 is a flow diagram of a method 400 for implementing an authenticated encryption algorithm to function in both a data encryption and authentication mode of operation as well as an authentication only mode of operation, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 400 may be performed by the MAC circuits 120 and 170.

With reference to FIGS. 2A-2C as well, the encryption circuit 210 may receive the AAD, the nonce, the data payload, and the encryption key and at block 405 may encrypt the data payload using the encryption key and the nonce to generate an encrypted data payload. At block 410, the encryption circuit 210 may also generate an authentication tag (referred to herein and in FIGS. 2A-2C as authentication tag 1) comprising a message integrity code (MIC) which the encryption circuit 210 may calculate based on the AAD and the encryption of the data payload. More specifically, as the encryption circuit 210 performs encryption operations on the data payload, its internal state (i.e., the internal state of the encryption and hashing algorithm implemented by the encryption circuit 210) will change as the data encryption progresses block by block through the data payload. The internal state of the encryption circuit 210 during encryption of the final block of the data payload is used by the encryption circuit 210 along with the AAD to generate the authentication tag 1. The encryption circuit 210 may output the authentication tag 1 to MPDU construction logic 250 and may output the encrypted data payload to the switch circuit 215. The switch circuit 215 may also receive the data payload as shown in FIG. 2A. More specifically, the MAC circuit 120 may copy the data payload block by block and provide the copied data payload to the switch circuit 215.

The encryption unit 205 may also include an authentication control flag which may be set to a first value (1) or a second value (0). At block 415, when the authentication control flag is set to a value of 1, the encryption unit 205 may function in an authentication only mode where it may use the authentication tag 1 generated by the encryption circuit 210 to provide replay and integrity protection to management frames (but does not provide/transmit encrypted data) as discussed in further detail herein. In authentication only mode, the encryption circuit 210 may generate the encrypted data payload and the authentication tag 1 as described hereinabove, and may output the authentication tag 1 to the MPDU construction logic 250 and output the encrypted data payload to the switch circuit 215. Because the encryption unit 205 is in authentication only mode, the switch circuit 215 may output the copied data payload (not the encrypted data payload) since the encrypted data is not needed.

The MPDU construction logic 250 may generate a plain text MPDU using the MAC header, the authentication tag 1, the copied data payload and the GCMP header. The MAC circuit 120 may output the plain text MPDU to the transmitter 100, which may transmit the plain text MPDU to the receiver 150.

At block 420, when the authentication control flag is set to a value of 0, the encryption unit 205 may function in a data encryption and authentication mode where it may encrypt the data payload as well as use the authentication tag 1 generated by the encryption circuit 210 to provide replay and integrity protection to management frames. More specifically, the encryption circuit 210 may generate the encrypted data payload and the authentication tag 1 as described hereinabove, and may output the authentication tag 1 to the MPDU construction logic 250 and output the encrypted data payload to the switch circuit 215. Because the encryption unit 205 is in "data encryption and authentication" mode, the switch circuit 215 may output the encrypted data payload (not the copied data payload) to the MPDU construction logic 250 since the encrypted data is to be transmitted.

The MPDU construction logic 250 may generate an encrypted MPDU using the MAC header, the authentication tag 1, the encrypted data payload, and the GCMP header and the MAC circuit 120 may output the encrypted MPDU to the transmitter 100, which may transmit the encrypted MPDU to the receiver 150.

At block 425, the MAC circuit 170 may receive the MPDU transmitted by the transmitter 100 and may parse from the MPDU the MAC header, the MAC address (shown as A2 in the FIGS.) and either the data payload (if the authentication control flag of encryption unit 205 is set to the first value (1)) of the received MPDU or the encrypted data payload (if the authentication control flag of encryption unit 205 is set to the second value (0)) of the received MPDU. The MAC circuit 170 may generate an additional authentication data (AAD) unit (which is similar to the AAD generated by the MAC circuit 120) based on information in the MAC header including the MPDU frame control (FC) field and a number of MPDU address fields as is known in the art. The MAC circuit 170 may also generate a nonce based on the MAC address and the current value of the package number (shown as PN in the FIGS.) as discussed with respect to FIG. 2A. The MAC circuit 170 may further parse from the received MPDU the authentication tag 1 (comprising the MIC) generated by the encryption circuit 210 and the encryption key (from the encryption header).

At block 430, if the authentication control flag of encryption/decryption unit 230 is set to the first value (1), the encryption/decryption circuit 235 may encrypt the data payload using the encryption key and the nonce to generate an encrypted data payload. The encryption/decryption circuit 235 may also generate the authentication tag 2 comprising a message integrity code (MIC) which the encryption/decryption circuit 235 may calculate based on the AAD and the encryption of the data payload as discussed with respect to authentication tag 1 generated by the encryption circuit 210. The encryption/decryption circuit 235 may output the authentication tag 2 to the encryption/decryption unit 230 and output the encrypted data payload to the switch circuit 240. The switch circuit 240 may also receive the data payload as shown in FIG. 2B. More specifically, the encryption/decryption unit 230 may copy the data payload block by block and provide the copied data payload to the switch circuit 240. Because the encryption/decryption unit 230 is the "authentication" mode, the switch circuit 215 may output the copied data payload (not the encrypted data payload) since the encrypted data is not needed.

If the authentication control flag of encryption/decryption unit 230 is set to the second value (0), the encryption/decryption circuit 235 may decrypt the encrypted data payload using the encryption key and the nonce to generate the data payload. The encryption/decryption circuit 235 may also generate an authentication tag comprising a message integrity code (MIC) which the encryption/decryption circuit 235 may calculate based on the AAD and the decryption of the encrypted data payload. More specifically, as the encryption/decryption circuit 235 performs decryption operations on the data payload, its internal state (i.e., the internal state of the encryption and hashing algorithm implemented by the encryption/decryption circuit 235) will change as the data decryption progresses block by block through the encrypted data payload. The internal state of the encryption/decryption circuit 235 during decryption of the final block of the encrypted data payload is used by the encryption/decryption circuit 235 along with the AAD to generate the authentication tag 2. The encryption/decryption circuit 235 may output the authentication tag 2 and may output the (decrypted) data payload to the switch circuit 215. The switch circuit 240 may also receive the encrypted data payload as shown in FIG. 2C. More specifically, the encryption/decryption unit 230 may copy the encrypted data payload block by block and provide the copied encrypted data payload to the switch circuit 240.

In either case, at block 435 the encryption/decryption unit 230 may compare the authentication tag 2 to the received authentication tag 1 to determine if they match. If the authentication tag 2 and the authentication tag 1 match, the encryption/decryption unit 230 may confirm that the management frames of the plain text MPDU received from the transmitter 100 have not been tampered with. If the authentication tag 2 and the authentication tag 1 do not match, the encryption/decryption unit 230 may determine that the management frames of the plain text MPDU received from the transmitter 100 have been tampered with and fail/discard the data payload.

FIG. 5 is a flow diagram of a method 500 for implementing an authenticated encryption algorithm to function in both a data encryption and authentication mode of operation as well as an authentication only mode of operation, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 500 may be performed by the MAC circuits 120 and 170.

Referring also to FIGS. 3A and 3B, at block 505, when the authentication control flag of the MAC circuit 120 is 1 (i.e., the encryption unit 205 and the encryption/decryption unit 230 are both operating in "authentication" mode), the switch circuit 215 may receive the AAD and the data payload, and may concatenate the AAD with the data from the data payload to generate an extended AAD that includes the data from the data payload. At block 510 the switch circuit 215 may set the length of the data payload to zero (since its data is now part of the extended AAD), and output both the extended AAD and the data payload (which now has a data length of zero) to the encryption circuit 210.

The encryption circuit 210 may receive the extended AAD, the data payload (data length of zero), the encryption key, and the nonce. At block 515, because the data payload length is zero, the encryption circuit 210 will not perform encryption and instead will only generate the authentication tag 1 for the extended AAD. The encryption circuit 210 may output the authentication tag 1 along with the extended AAD to the MPDU construction logic 250. The MPDU construction logic 250 may generate a plaintext MPDU using the MAC header, the extended AAD, the authentication tag 1, and the GCMP header. The MAC circuit 120 may output the plaintext MPDU to the transmitter 100, which may transmit the plaintext MPDU and the encryption key to the receiver 150.

FIG. 3B illustrates the MAC circuit 170 when the authentication control flag of the encryption/decryption unit 230 (and thus the authentication control flag of the encryption unit 205) is set to a value of 1 (i.e., the encryption unit 205 and the encryption/decryption unit 230 are both operating in "authentication" mode). At block 520, in response to receiving the plaintext MPDU from the transmitter 100, the MAC circuit 170 may parse from the plaintext MPDU, the MAC header, the MAC address (shown as A2 in the FIGS.), the data payload (from the extended AAD), and the authentication tag 1. The MAC circuit 170 may generate an AAD and a nonce based on the MAC address and the current value of the package number (shown as PN in the FIGS.).

The switch circuit 240 may receive the AAD and the data payload and at block 525 may concatenate the AAD with the data from the data payload to generate an extended AAD that includes the data from the data payload. At block 530 the switch circuit 240 may set the length of the data payload to zero (since its data is now part of the extended AAD), and output both the extended AAD and the data payload (which now has a data length of zero).

The encryption/decryption circuit 235 may receive the extended AAD, the data payload (data length of zero), the encryption key, and the nonce. Because the length of the data payload has been set to zero, the encryption/decryption circuit 235 may not perform decryption on the data payload and instead may only generate an authentication tag 2.

At block 535, the encryption/decryption unit 230 may compare the authentication tag 2 to the received authentication tag 1 to determine if they match. If the authentication tag 2 and the authentication tag 1 match, the encryption/decryption unit 230 may confirm that the management frames of the plaintext MPDU received from the transmitter 100 have not been tampered with. If the authentication tag 2 and the authentication tag 1 do not match, the encryption/decryption unit 230 may determine that the management frames of the encrypted MPDU received from the transmitter 100 have been tampered with and fail/discard the encrypted data payload.

When the authentication control flag of the MAC circuit 120 is 0 (i.e., the encryption unit 205 and the encryption/decryption unit 230 are both operating in "data encryption and authentication" mode), the switch circuit 215 may receive the AAD and the data payload and pass the AAD and the data payload to the encryption circuit 210 which may generate an encrypted data payload and the authentication tag 1. The encryption circuit 210 may output the authentication tag 1 and the encrypted data payload to the MPDU construction logic 250. The MPDU construction logic 250 may generate an encrypted MPDU using the MAC header, the authentication tag 1, the encrypted data payload, and the GCMP header and the MAC circuit 120 may output the encrypted MPDU to the transmitter 100, which may transmit the encrypted MPDU to the receiver 150.

Referring also to FIG. 3C, in response to receiving the encrypted MPDU from the transmitter 100, the MAC circuit 170 may parse from the encrypted MPDU, the MAC header, the MAC address (shown as A2 in the FIGS.), the encrypted data payload (from the extended AAD), and the authentication tag 1. The MAC circuit 170 may generate an AAD and a nonce based on the MAC address and the current value of the package number (shown as PN in the FIGS.).

The switch circuit 240 may receive the AAD and the encrypted data payload and may pass the AAD and the encrypted data payload to the encryption/decryption circuit 235 which may decrypt the encrypted data payload and generate an authentication tag 2 as discussed hereinabove. The encryption/decryption unit 230 may compare the authentication tag 2 to the received authentication tag 1 to determine if they match. If the authentication tag 2 and the authentication tag 1 match, the encryption/decryption unit 230 may confirm that the management frames of the encrypted MPDU received from the transmitter 100 have not been tampered with. If the authentication tag 2 and the authentication tag 1 do not match, the encryption/decryption unit 230 may determine that the management frames of the encrypted MPDU received from the transmitter 100 have been tampered with and fail/discard the encrypted data payload.

Figure 6:
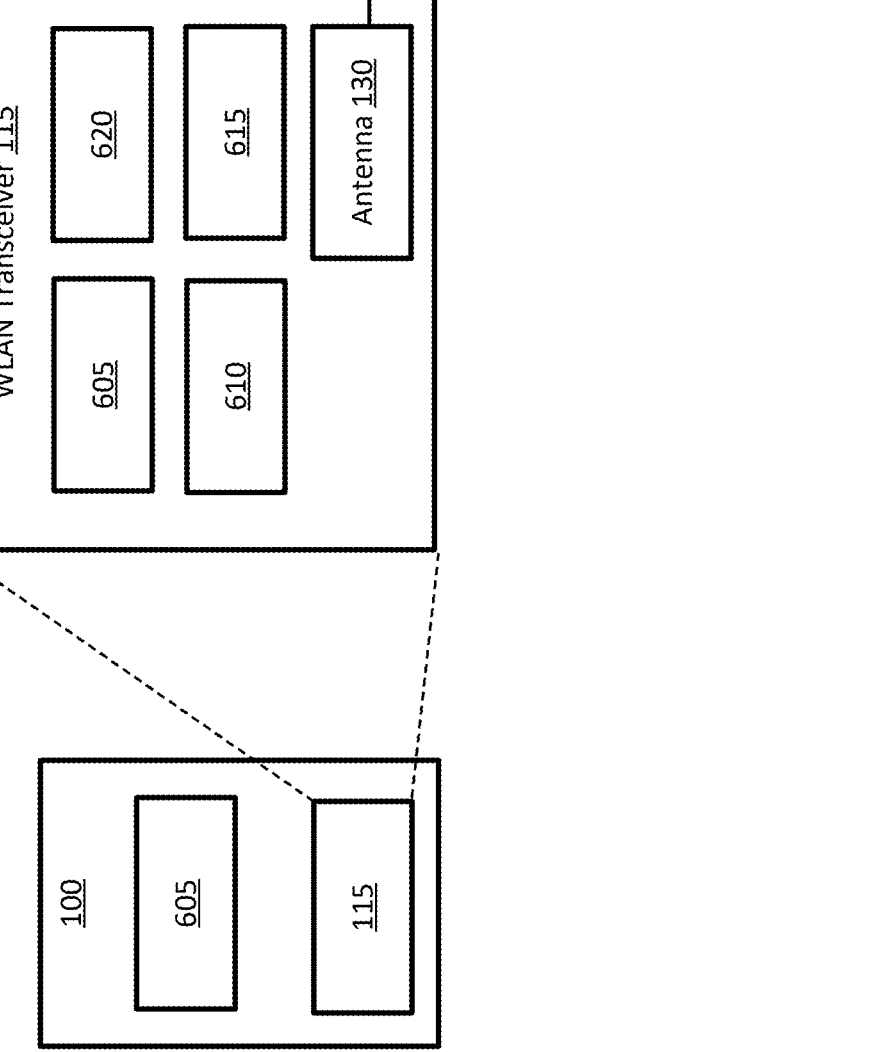
FIG. 6 is a detailed block diagram of the transmitter of FIG. 1, according to some embodiments of the present disclosure.

FIG. 6 is a simplified block diagram of the transmitter 100 with a more detailed view of the WLAN transceiver 115 inset, in accordance with some embodiments of the present disclosure. The transmitter 100 100 may include a general purpose input/output (GPIO) 605 and the WLAN transceiver 115. The GPIO 605 may comprise an uncommitted digital signal pin which may be used as an input or output for the WLAN transceiver 115. The WLAN transceiver 115 may include a processing device 605, a memory 610, a physical layer chip 615 and a media access control (MAC) layer chip 620. The physical layer chip 615 may handle conversion of a signal from a clocked digital format into an analog format suitable for longer range transmission and vice versa. The MAC layer chip 620 may assemble bits received from the physical layer chip 615 into packets and validate them, as well as receive packets of data from the processing device 605 for example, and convert them to streams of bits to be provided to the physical layer chip 615. It should be noted that FIG. 6 illustrates an embodiment where the WLAN transceiver 115 includes its own dedicated processing device and memory, and the instructions for performing the techniques described herein may be included as firmware within the memory of the WLAN transceiver 115.

Figure 7:
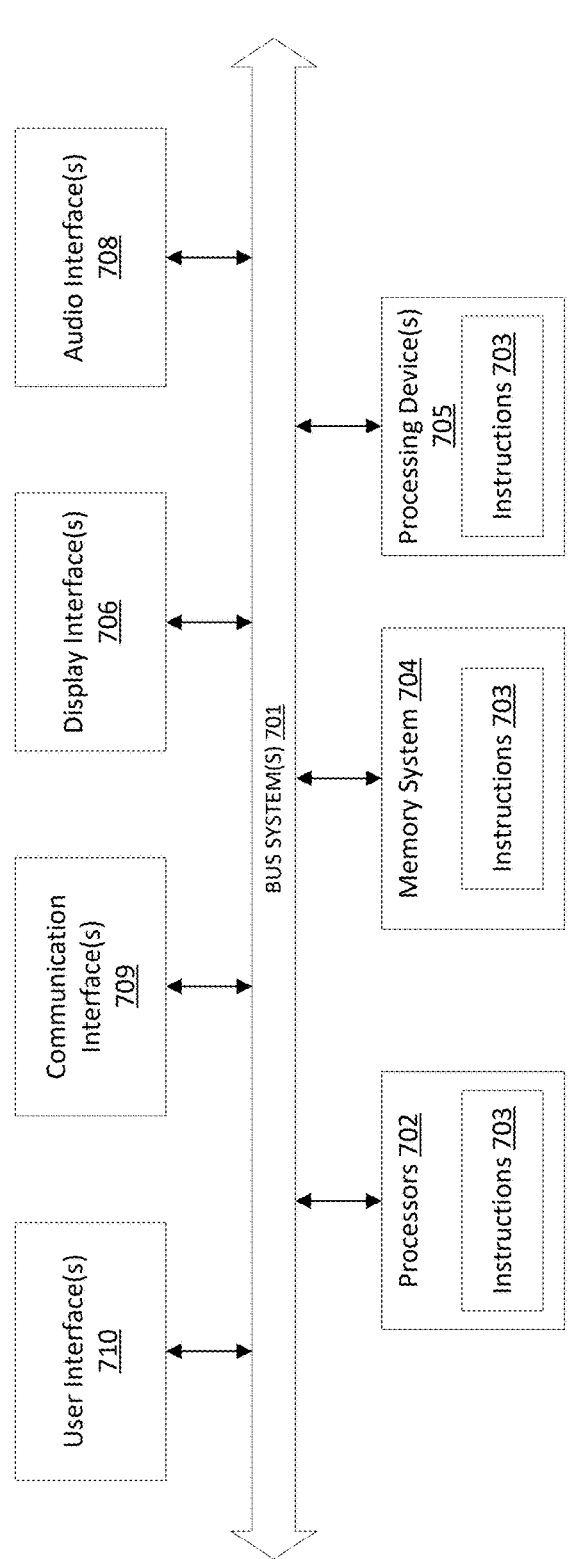
FIG. 7 illustrates a communication device, according to some embodiments of the present disclosure.

FIG. 7 is a block diagram illustrating a communication device 700, in accordance with some embodiments of the present disclosure. The communication device 700 may fully or partially include and/or operate the example embodiments of the transmitter 100 and the receiver 150 or portions thereof as described with respect to FIGS. 1-3B. The communication device 700 may be in the form of a computer system within which sets of instructions may be executed to cause the communication device 700 to perform any one or more of the methodologies discussed herein. The communication device 700 may operate as a standalone device or may be connected (e.g., networked) to other machines. In a networked deployment, the communication device 700 may operate in the capacity of a server or a client machine in server-client network environment, or as a peer machine in a P2P (or distributed) network environment.

The communication device 700 may be an Internet of Things (IoT) device, a server computer, a client computer, a personal computer (PC), a tablet, a set-top box (STB), a voice controlled hub (VCH), a Personal Digital Assistant (PDA), a mobile telephone, a web appliance, a network router, switch or bridge, a television, speakers, a remote control, a monitor, a handheld multi-media device, a hand-held video player, a handheld gaming device, or a control panel, or any other machine capable of executing a set of instructions (sequential or otherwise) that specify actions to be taken by that machine. Further, while only a single communication device 700 is illustrated, the term "device" shall also be taken to include any collection of machines that individually or jointly execute a set (or multiple sets) of instructions to perform any one or more of the methodologies discussed herein.

The communication device 700 is shown to include processor(s) 702. In embodiments, the communication device 700 and/or processors(s) 702 may include processing device(s) 705 such as a System on a Chip processing device, developed by Cypress Semiconductor Corporation, San Jose, Calif. Alternatively, the communication device 700 may include one or more other processing devices known by those of ordinary skill in the art, such as a microprocessor or central processing unit, an application processor, a host controller, a controller, special-purpose processor, digital signal processor (DSP), an application specific integrated circuit (ASIC), a field programmable gate array (FPGA), or the like. Bus system 701 may include a communication block (not shown) to communicate with an internal or external component, such as an embedded controller or an application processor, via communication interfaces(s) 709 and/or bus system 701.

Components of the communication device 700 may reside on a common carrier substrate such as an IC die substrate, a multi-chip module substrate, or the like. Alternatively, components of the communication device 700 may be one or more separate ICs and/or discrete components.

The memory system 704 may include volatile memory and/or non-volatile memory which may communicate with one another via the bus system 701. The memory system 704 may include, for example, random access memory (RAM) and program flash. RAM may be static RAM (SRAM), and program flash may be a non-volatile storage, which may be used to store firmware (e.g., control algorithms executable by processor(s) 702 to implement operations described herein). The memory system 704 may include instructions 703 that when executed perform the methods described herein. Portions of the memory system 704 may be dynamically allocated to provide caching, buffering, and/or other memory-based functionalities.

The memory system 704 may include a drive unit providing a machine-readable medium on which may be stored one or more sets of instructions 703 (e.g., software) embodying any one or more of the methodologies or functions described herein. The instructions 703 may also reside, completely or at least partially, within the other memory devices of the memory system 704 and/or within the processor(s) 702 during execution thereof by the communication device 700, which in some embodiments, constitutes machine-readable media. The instructions 703 may further be transmitted or received over a network via the communication interfaces(s) 709. The communication interface(s) 709 may be where the communication device 100 discussed herein is implemented.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The communication device 700 is further shown to include display interface(s) 706 (e.g., a liquid crystal display (LCD), touchscreen, a cathode ray tube (CRT), and software and hardware support for display technologies), audio interface(s) 708 (e.g., microphones, speakers and software and hardware support for microphone input/output and speaker input/output). The communication device 700 is also shown to include user interface(s) 710 (e.g., keyboard, buttons, switches, touchpad, touchscreens, and software and hardware support for user interfaces).

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "transmitting," "receiving," "comparing," "determining," "detecting," "classifying," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:

1. A system comprising:
a transmitter device comprising:
  a first encryption device configured to:
    perform an encryption process on data to generate encrypted data;
    generate a first authentication tag based at least in part on the encryption process;
    when a first control flag of the first encryption device has a first value, output the data for transmission as part of a MAC protocol data unit (MPDU) comprising the first authentication tag; and
    when the first control flag has a second value, output the encrypted data for transmission as part of the MPDU; and
  a receiver device configured to receive the MPDU from the transmitter device, the receiver device comprising:
    a second encryption device configured to operate based on a value of a second control flag, wherein when the second control flag has the first value, the second encryption device is to:
      receive the data and the first authentication tag from the MPDU;
      perform the encryption process on the data to generate second encrypted data;
      generate a second authentication tag based at least in part on the encryption process; and
      compare the first authentication tag and the second authentication tag to validate one or more management frames associated with the data,
    wherein the first authentication tag and the second authentication tag each comprise a corresponding message integrity code (MIC).

2. The system of claim 1, wherein when the second control flag has the second value, the second encryption device is configured to:
  receive the encrypted data and the first authentication tag from the MPDU;
  perform a decryption process on the encrypted data to generate the data;
  generate a third authentication tag based at least in part on the decryption process; and
  compare the first authentication tag and the third authentication tag to validate the one or more management frames associated with the data.

3. The system of claim 1, wherein the first encryption device comprises:
  an encryption circuit configured to perform the encryption process and generate the first authentication tag; and
  a switch circuit to operate based on the value of the first control flag, the switch circuit configured to:
    receive the data and the encrypted data;
    when the first control flag has the first value, output the data; and
    when the first control flag has the second value, output the encrypted data.

4. The system of claim 2, wherein the receiver device comprises:
  an encryption circuit configured to perform the encryption or the decryption process and generate the second authentication tag; and
  a switch circuit to operate based on the value of the second control flag, the switch circuit configured to:

receive the data and the encrypted data;
    when the second control flag has the first value, output the data; and
    when the second control flag has the second value, output the data.

5. The system of claim 1, wherein the first encryption device generates the first authentication tag based on an internal state of the encryption process.

6. The system of claim 1, wherein the second encryption device is further configured to set the value of the second control flag based on the value of the first control flag.

7. A method comprising:
  performing, by a first encryption device of a transmitter device, an encryption process on data to generate encrypted data;
  generating a first authentication tag based at least in part on the encryption process;
  when a first control flag of the first encryption device has a first value, outputting the data for transmission as part of a MAC protocol data unit (MPDU) comprising the first authentication tag; and
  when the first control flag has a second value, outputting the encrypted data for transmission as part of the MPDU;
  receiving by a receiver device, the MPDU, wherein the receiver device comprises a second encryption device to operate based on a value of a second control flag;
  when the second control flag has the first value, receiving by the second encryption device, the data and the first authentication tag from the MPDU;
  performing the encryption process on the data to generate second encrypted data;
  generating a second authentication tag based at least in part on the encryption process; and
  comparing the first authentication tag and the second authentication tag to validate one or more management frames associated with the data,
  wherein the first authentication tag and the second authentication tag each comprise a corresponding message integrity code (MIC).

8. The method of claim 7, further comprising:
  when the second control flag has the second value, receiving by the second encryption device, the encrypted data and the first authentication tag from the MPDU;
  performing a decryption process on the encrypted data to generate the data;
  generating a third authentication tag based at least in part on the decryption process; and
  comparing the first authentication tag and the third authentication tag to validate the one or more management frames associated with the data.

9. The method of claim 7, wherein outputting the data for transmission as part of the MPDU and outputting the encrypted data for transmission as part of the MPDU are performed by a switch circuit configured to operate based on the value of the first control flag.

10. The method of claim 7, wherein the first authentication tag is generated based on an internal state of the encryption process.

11. The method of claim 7, further comprising:
  setting, by the second encryption device, the value of the second control flag based on the value of the first control flag.

12. A system comprising:
  a transmitter device comprising:
    a first encryption device configured to:

receive a data payload and an additional authentication data (AAD) unit;

concatenate data from the data payload and the AAD to generate an extended AAD;

set a data length of the data payload to zero;

perform an encryption process on the data payload;

generate a first authentication tag based at least in part on the encryption process;

output the extended AAD and the first authentication tag for transmission as part of a MAC protocol data unit (MPDU);

a receiver device configured to receive the MPDU from the transmitter device, the receiver device comprising:

a second encryption device configured to:

receive a second data payload and the first authentication tag from the MPDU;

receive a second AAD;

concatenate the second AAD with data from the second data payload to generate a second extended AAD;

perform a decryption process on the second data payload;

generate a second authentication tag based at least in part on the decryption process; and compare the first authentication tag and the second authentication tag to validate one or more management frames associated with the data, wherein the first authentication tag and the second authentication tag each comprise a corresponding message integrity code (MIC).

13. The system of claim 12, wherein the first encryption device comprises:

a switch circuit configured to:

receive the data payload and the AAD;

concatenate the data from the data payload and the AAD to generate an extended AAD;

set the data length of the data payload to zero; and output the extended AAD and the data payload; and an encryption circuit configured to:

receive the extended AAD and the data payload;

perform the encryption process on the data payload; and generate the first authentication tag.

14. The system of claim 12, wherein the receiver device comprises:

a switch circuit configured to:

receive the second data payload and the first authentication tag from the MPDU;

receive the second AAD;

concatenate the second AAD with data from the second data payload to generate a second extended AAD; and an encryption circuit configured to:

perform the decryption process on the second data payload; and generate a second authentication tag based at least in part on the decryption process.

15. The system of claim 12, wherein the first encryption device generates the first authentication tag based on an internal state of the encryption process.

16. The system of claim 12, wherein the first encryption device generates the first authentication tag based further on the extended AAD.

17. The system of claim 12, wherein the first encryption device performs the encryption process in a Galois/Counter mode of operation.

* * * * *